Dec. 5, 1933.  A. ROSENTHAL  1,937,981
EXTENSION CORD
Filed Nov. 16, 1931
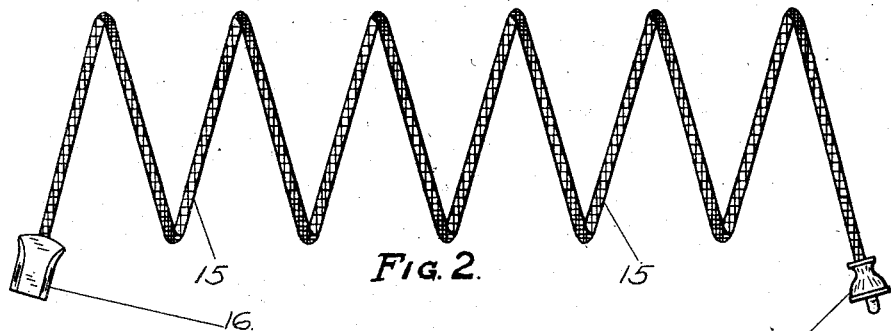
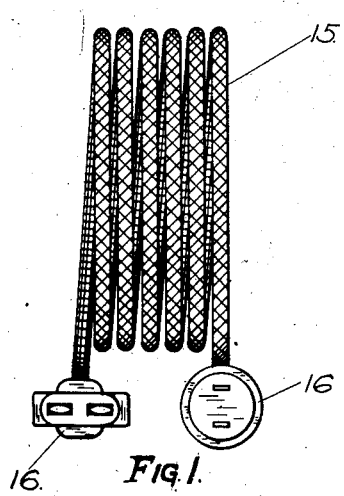
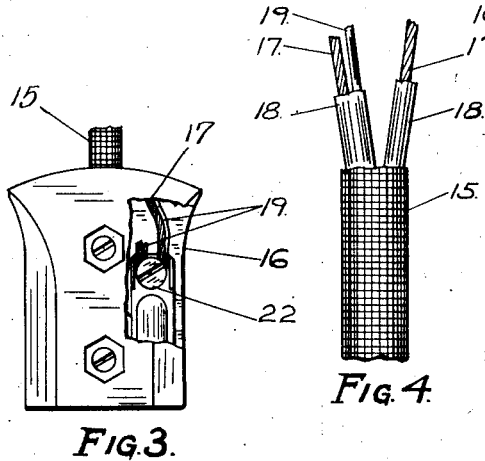
Fig. 1.  Fig. 3.  Fig. 4.
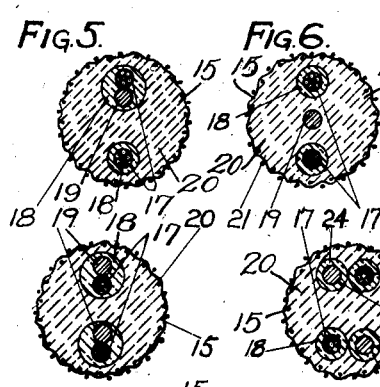
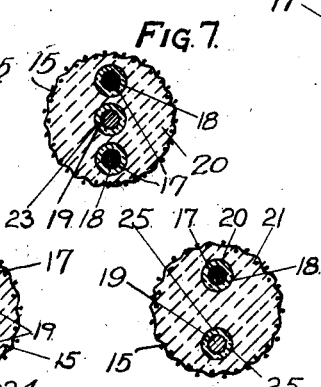
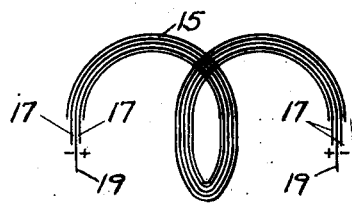
Fig. 13.
Fig. 5.  Fig. 6.  Fig. 7.
Fig. 8.  Fig. 9.  Fig. 10.  Fig. 11.
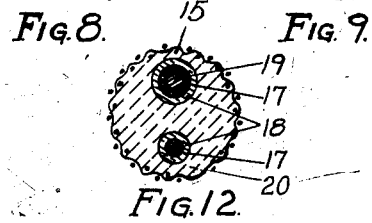
Fig. 12.
Abraham Rosenthal INVENTOR
BY Martin Joachimson
ATTORNEY Patented Dec. 5, 1933

1,937,981

UNITED STATES PATENT OFFICE 1,937,981

EXTENSION CORD

Abraham Rosenthal, Brooklyn, N. Y.

Application November 16, 1931
Serial No. 575,257

2 Claims. (Cl. 173—367)

This invention relates to extension cords and more particularly to extension cords for electrical appliances.

In using the modern household electrical appliances such as electrical sad irons, a portable extension cord is used. One of its ends is plugged into the socket in the wall connected to the house source of electrical energy and its other end is plugged into the socket on the iron or other appliance as is well known. Such portable extension cord is usually very flexible, the two conducting wires forming such cord usually being very flexible, with the result that the length of cord between the two ends thereof tends to form wrinkles and folds and becomes knotted, and if of considerable length as is usually the case gets into all sorts of difficulty making it very troublesome and annoying.

It is a primary object of the present invention to prevent such extension cord from becoming entangled and knotted. It is a further object to keep such extension cord in an orderly fashion. It is a still further object to take up the usual slack found in such extension cord. A further object is to construct such an extension cord so that it takes up a minimum of space. A still further object is to permanently and automatically keep such a cord in an orderly nested arrangement. A further object is to provide an extension cord that can readily be packed for shipment.

The foregoing and other objects of the invention are accomplished by providing the extension cord with two conducting wires each formed with a plurality of thin flexible copper wires as is found in the ordinary extension cord suitably insulated from each other and both covered with suitable insulating material such as silk fabric. In addition there is inside said cord so that it is out of sight an additional wire of flexible but stiff material formed of a single strand, such for instance as piano wire. This single strand wire is considerably stiffer than the two conducting wires. Before it is inserted into the extension cord it is formed into helical or spiral coils so that when it is extended by pressure it has the capacity to return to its pre-coiled form. If desired, this pre-coiled single strand wire may be used as one of the conducting wires of the extension cord making it only necessary to use but one copper conducting wire.

The invention will be better understood from the description thereof to follow, taken in connection with the accompanying drawing in which—

Figure 1 is a front view of the improved extension cord such as is used for connecting an electrical sad iron to a source of electrical energy in coiled formation.

Figure 2 is a front view of the improved cord in extended position.

Figure 3 is an enlarged view in detail showing how the end of the single strand wire is fixed to the plug.

Figure 4 is an enlarged detail view of the end of the cord.

Figure 5 is a cross sectional view of the cord shown in Figure 1.

Figures 6, 7, 8, 9, 10, 11 and 12 are views in cross section showing modified forms of the invention.

Figure 13 is a diagram showing the parallel arrangement of the spring wire and conductors within the cord.

With reference to the improved cord shown in Figures 1 to 5 of the drawing, the extension cord 15 may be used as aforesaid with electrical sad irons, electrical heaters, toasters, with telephones or other electrical household or office equipment, or with various other devices as will be understood. The cord has a plug 16, of any desired construction, secured to each end thereof, one of which is plugged into a socket connected to the main electrical supply of energy and the other of which is plugged into the socket in the electrical appliance, such as an iron. The length of cord between these plugs 16, in the ordinary cord, when not extended as in use, usually is a source of considerable annoyance as it becomes knotted, entangled and interferes with the surrounding paraphernalia, and the longer it is the more trouble it causes. The cord 15 is formed of a pair of conducting wires 17 suitably encased in insulating material 18, each of said wires being formed of a plurality of thin flexible copper wires as in the ordinary conducting wire. Placed in between said wires 17 is another wire 19 formed of a single strand of bare spring wire such as the so-called "piano" wire. These wires 17 and 19 are placed alongside each other as shown in Figures 5 and 11, running parallel to each other throughout their lengths, and each surrounded by suitable packing and insulating material, such as asbestos 20. The entire structure is covered and finished off with silk fabric 21 or other suitable braiding material.

The spring wire 19 before it is inserted into the cord 15 is pre-coiled, that is, formed with helical or spiral coils and nested, such wire being made of such material that it has the capacity to return to its pre-coiled nested state. After insertion, each end is fixed. In Figure 3 the end is shown as secured to the plug by means of a screw 22, but of course any other suitable way of securing the ends may be used. Each end may be anchored at any point along the extension cord so long as each end is fixed. The presence of this pre-coiled spring wire 19 in the cord makes the cord assume a permanent nested coiled formation such as shown in Figure 1. One plug of the improved cord is plugged into the outlet connecting it to the source of electrical energy, and the other plug on the other end is plugged into the socket in the iron or other electrical appliance, and when the said appliance is moved during use, the cord 15 stretches or extends as shown in Fig. 2, with little or no resistance, permitting the appliance to be used as desired. When the tension is removed, the cord will resume its coiled nested state such as shown in Figure 1. It will be seen from the foregoing that the cord stretches easily and automatically resumes its normal coiled and nested position, and that no matter how little or how far it stretches, it assumes an orderly formation eliminating any entangling wrinkles or knots. When it is in its normal coiled position, it takes up a minimum of space and presents a pleasing orderly appearance. A number of these coiled extension cords can very readily be packed in a single case for shipment and very readily removed from the shipping case without any danger of entangling as is the case with the ordinary extension cords unless separately packed.

In the form of the invention shown in Figure 6, the spring wire 19 is bare and is positioned between the conductors 17.

In the form shown in Figure 7, the spring wire 19 is encased in suitable insulating material 23 and positioned between the conducting wires 17.

In Figure 8, a spring wire 19 is shown alongside of each conductor 17, making a pair and each pair is insulated.

In Figure 9, a spring wire 19 is shown alongside of each conductor 17, but each of such wires 19 is covered with suitable insulating material 24, the conductors being insulated.

Figure 10 discloses a single flexible copper conducting wire 17 suitably insulated and a single strand wire 19 formed of a single strand but covered with insulating material 25.

Figure 11 shows two conducting cables each enclosed by insulating material 18 and each consisting of a core 19 of a spring wire which is surrounded by standard conductors 17. The two cables are imbedded in refractory material 20 and surrounded by fibrous braiding 15.

Figure 12 is similar to Figure 11 but only one of the two cables has a core 19 of spring wire.

It will be seen that in Figures 10, 11 and 12 one or more pre-coiled spring wires are used for conducting current, while in Figures 6, 7 and 9 the spring wire 19 is insulated from the conductors 17 and in Figures 5 and 8 the spring wire 19 and conductors 17 are enclosed within the same insulating covering 18.

The improved device is not necessarily limited to use with cords for conducting electricity but may be used with all sorts of extension cords where it is desired to provide an orderly shaped cord free from knots and entanglements. I desire therefore to be limited only by the state of the prior art and the appended claims.

I claim:

1. A flexible extension cord for conducting electricity to electrical appliances comprising a pair of conducting wires individually insulated, a coiled nested wire of spring material, said coiled wire being positioned lengthwise alongside of and parallel to said conducting wires, asbestos packing material around all of said wires and a finish fabric cover for such material and a plug at each end to which the wires are secured.

2. An extension cord comprising a conductor, a casing for said conductor comprising an insulating cover, a second conductor, a casing for said latter conductor comprising an insulating cover, an asbestos packing and insulating material encasing and embedding said conductors and casings, a slack take up spring wire embedded in said asbestos material and disposed alongside said conductors and an outer casing for said parts.

ABRAHAM ROSENTHAL.